United States Patent [15] 3,683,445

Hagadorn [45] Aug. 15, 1972

[54] TAPE CLEANING DEVICE

[72] Inventor: Margery F. Hagadorn, Waltham, Mass.

[73] Assignee: Honeywell, Inc., Minneapolis, Minn.

[22] Filed: April 20, 1970

[21] Appl. No.: 29,936

[52] U.S. Cl. .................................... 15/308, 15/256.5
[51] Int. Cl. ............................................ A47l 9/06
[58] Field of Search....15/308, 401, 93 R, 300 R, 306 A, 15/309, 100, 256.5; 352/130

[56] References Cited

UNITED STATES PATENTS

| | | | |
|---|---|---|---|
| 3,370,314 | 2/1968 | Morello | 15/308 |
| 3,091,794 | 6/1963 | Pillsbury, Jr. | 15/308 |
| 3,195,164 | 7/1965 | Gysling | 15/308 |
| 3,059,266 | 10/1962 | Cleveland | 15/308 |

OTHER PUBLICATIONS

IBM Technical Disclosure Bulletin, "Blade Scraping Tape Cleaner," C. P. Hayunga, November 1966, IBM Inc.
" Technical Data–Grade 608 Carboloy Chrome Carbide," 1958, Metallurgical Prod. Dep't. GE Comp.

*Primary Examiner*—Walter A. Scheel
*Assistant Examiner*—C. K. Moore
*Attorney*—Fred Jacob and Leo Stanger

[57] ABSTRACT

Tape cleaning apparatus for use in a magnetic tape transport device having a tape cleaner head which is located in the path of the moving tape. The tape cleaner head is provided with a blade formed of substantially non-magnetic hard material and operates in combination with vacuum to remove foreign particles of material from the tape surface to prevent signal disturbance.

9 Claims, 3 Drawing Figures

INVENTOR
MARGERY F. HAGADORN
BY
ATTORNEY

TAPE CLEANING DEVICE

BACKGROUND OF THE INVENTION

One of the more common types of recorder used in conjunction with computers is a device wherein magnetic tape is employed having either or both read and write capabilities. Information is recorded on the tape by magnetizing discrete areas of the tape in one or the other of two magnetic states. This type of device is a highly versatile storage medium for data files and programs, and has therefore met with wide acceptance as a commonly used input/output device.

As the tape is moved past the read or write head of the device, the foreign matter or irregularities in the tape surface may cause loss of information by moving the tape away from the head. Various deposits of foreign matter, or flakes of material from the tape surface itself, may be deposited on the tape surface causing signal errors on the tape when carried through the read/write head. It is therefore obvious that the removal of particles deposited on the tape surface is of prime importance in producing a reliable input/output device of the type described for use in a computer system. In particular, it is essential that the tape surface be retained free of foreign matter to develop the capability of reproducing or recording the vast amount of information that can be written or stored on a reel of tape, at the speeds at which the recording or redout can take place.

The invention therefore has as an object to provide an improved tape cleaning device for use with a magnetic tape transport device.

Another object of the invention is to provide an improved tape cleaning device which demonstrates reliability over a long period of use.

A further object of the invention is to provide an improved tape cleaning device which is both simple in operation and construction.

SUMMARY OF THE INVENTION

The above objects, and other objects which will become apparent to the reader, are achieved by providing a tape cleaner having a head with a surface extending into the prescribed path over which the tape is moved in the tape transport device. An opening is formed in the head at the surface extending into the tape path and generally elongated in a direction transverse to the tape path. An elongated blade member of hard substantially non-magnetic material is disposed in the opening and has a blade edge extending beyond the head surface into the tape path. Sub-atmospheric pressure is provided in the head opening to draw the particles of material removed from the tape surface by the blade and draw them into the head for disposal.

BRIEF DESCRIPTION OF THE DRAWINGS

For a better understanding of the present invention, reference should be had to the following detailed description of the preferred embodiment, when read in conjunction with the accompanying drawings in which.

DESCRIPTION OF THE PREFERRED EMBODIMENT

Figures 1, 2:
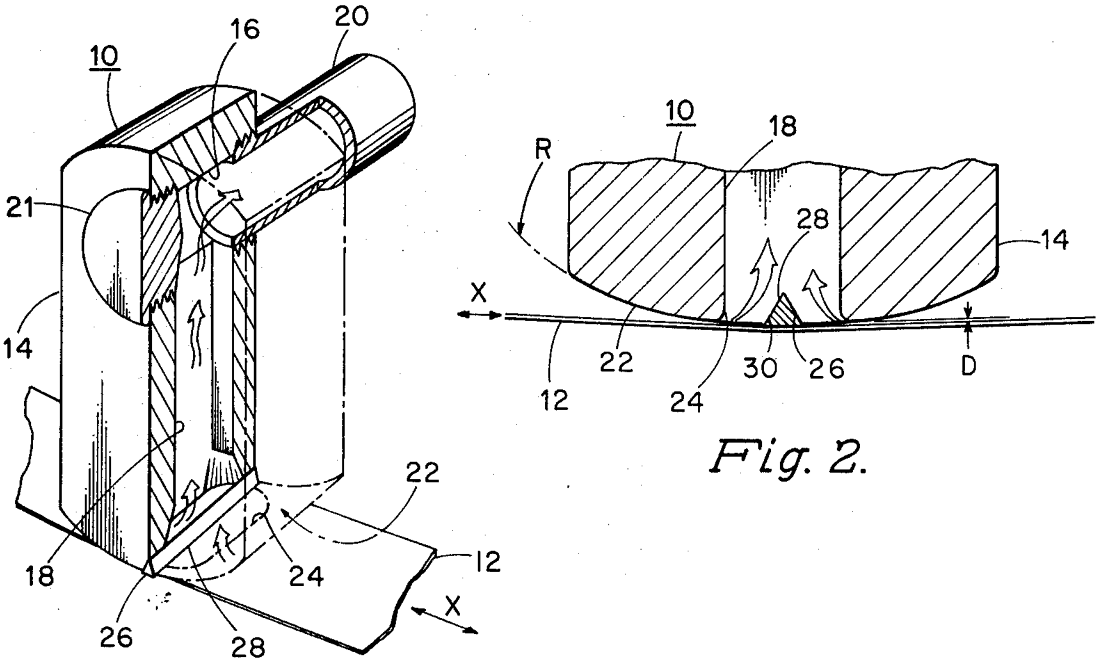
FIG. 1 is a perspective view, partially in section, showing details of the arrangement of elements in the construction of a typical embodiment of the invention.
FIG. 2 is a fragmentary sectional view showing in detail elements of the embodiment of FIG. 1, taken on an enlarged scale for clarity.

Referring now to the drawings, and in particular FIG. 1 taken in conjunction with FIG. 2, there is shown a tape cleaner head 10 in its functional environment wherein a tape segment 12 is being transported along a prescribed tape path generally designated as X. The tape cleaner head 10, as shown, comprises a metallic block 14 having a bore 16 formed adjacent one end, and an elongated bore 18 formed at right angles to the bore 16 and in communication therewith. A tubular member 20 is threadedly received in one end of the bore 16, and an end cap 21 is received in sealing engagement by the threads provided at the opposite end of the bore.

The tubular member 20 in combination with the bores 16 and 18 provide a conduit by which sub-atomospheric pressure is induced in the cleaner head 10 through operation of a vacuum producing means (not shown) which is operatively connected to the tubular member 20. The vacuum producing means may be any vacuum pump or other device of the type well-known in the art, or the tubular member may be connected into a more complex vacuum system which is provided to perform a plurality of functions in a tape transport of the type which will be referred to hereinafter.

At the opposite end of the block 14, there is provided a generally curved surface 22 of radius, R, which intersection with the bore 18 forms an elongated opening 24. Adjacent each end of the elongated opening 24 a triangular slot 26 is formed in the surface 22, and an elongated blade 28 of triangular cross-section is affixed in the slot 26 spanning the elongated opening 24.

Referring now in particular to FIG. 2, it will be noted that the blade 28 is substantially equilateral as well as triangular in cross-section and therefore has a surface 30 which intersects with adjacent surfaces of the blade 28 to form blade edges subtending an angle of 60°. The cross-sectional width dimension of the surface 30 (and its adjacent surfaces which are equal) determine the radius R which is so chosen that the blade edges formed by the surface 30 extend a dimension D below the intersection of the surface 22 with the slotted opening 26. In practice, it has been found that the dimension D should be maintained in the order of one to two thousandths of an inch, which generally provides adequate surface contact with the tape 12 for removal of material from the tape surface, without damage to the tape.

Figure 3:
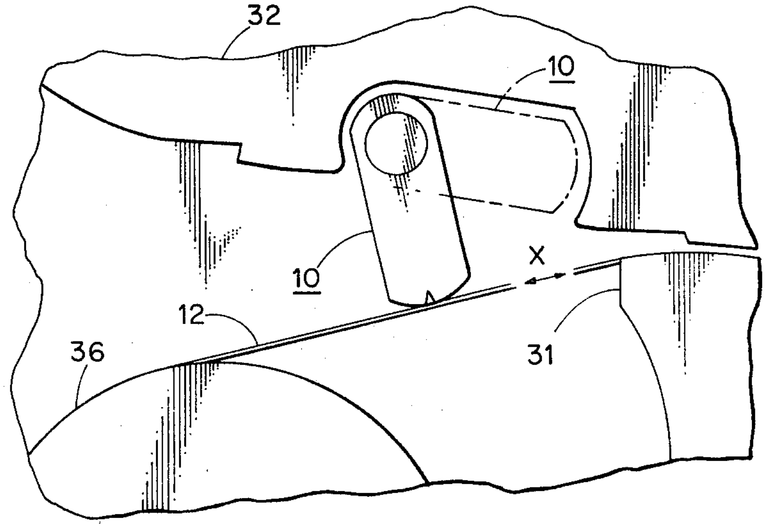
FIG. 3 is a fragmentary view showing the embodiment of FIG. 1 as employed in a typical magnetic tape transport system.

Referring now to FIG. 3 taken in conjunction with FIGS. 1 and 2, operation of the device will be best explained with reference to its use in a tape transport apparatus 32 which is shown in part. While not limited in its use to any particular tape transport configuration, it will be understood that the present embodiment depicted in FIGS. 1 and 2 is advantageously employed in a tape transport system as disclosed in the copending application to Charles A. Tolini et al., Ser. No. 29,935 filed Apr. 20, 1970 and assigned to the assignee of the present invention. As shown in FIG. 3, the tape cleaner head 10 is mounted adjacent a portion of the tape path X extending from a guide surface 31 to a drive capstan 36 over which the tape 12 passes during a read or write cycle of the tape transport system. In the embodiment shown in FIG. 3, the tape cleaner head 10 is located in the depicted position during a read or write cycle of the device, with the blade 28 extending into the tape path X as similarly shown in FIGS. 1 and 2. However, in the aforementioned disclosure of Tolini et al., there is disclosed a self-threading feature which makes it advantageous that the tape cleaner head 10 be withdrawn from the tape path X during the threading operation. There are many other related tape drive devices wherein it will also be found advantageous during the threading operation to retain a clear path from the tape guide to the capstan or along related tape path areas wherein the tape cleaner head 10 would be employed. As a further feature of the invention, therefore, the tubular member 20 is operatively connected to a motive means (not shown) which is operative to rotate the tape cleaner head 10 into its operative position in the tape path X and out of the operative position, as shown in dot dash lines in FIG. 3. While in other tape cleaning apparatus wherein the tape cleaner is not projected into the tape path this feature would be of minor importance in the present invention wherein the tape cleaner head 10 is projected into the tape path this pivotal feature of the invention is intended to substantially extend the use to which the tape cleaner device is adaptable.

In operation, as the tape 12 is drawn along the path X, in either direction the blade 28 extends into the tape path by the dimension D as shown in FIG. 2. A triangular shape of the blade 28 together with the vacuum induced in the head 10 combined to remove foreign particles from the tape 12 and convey them along the inclined face of the blade 28 for subsequent disposal. It should here be mentioned that the thrusting of the blade 28 into the tape path X insures good contact between the blade 28 and the tape 12 which is not the case in prior art devices wherein vacuum alone is used to remove foreign particles from the tape. Additionally, the triangular construction of the blade 28 is effective to cause the air flow pattern to lift the particles of materials up and away from the tape and the blade edges, thereby preventing build-up of the particles on the blade edge. Another advantage of the triangular construction of the blade 28 is that the 60° configuration of the blade edge is such that the wear pattern on the blade does not substantially change the angle which is not the case in devices employing for instance a rectangular cross-section blade for tape cleaning.

While a general description of the elements and their arrangement which comprise the tape cleaner head 10 have been presented, a more detailed explanation of the various elements and their advantages will now be provided.

The block 14 may be manufactured of any suitable material, and it has been found that a half hard brass material having a hard chrome plating applied thereto is effective to match the wear characteristics of the blade 28 which construction and characteristics will be described in detail below. An important feature in the present construction is that the wear characteristics of the surface 22 and the blade 28 are matched within limits such that the two wear substantially as a pair, thereby maintaining their relative positions in the tape path X as close as possible.

In constructing the blade 28, a material was chosen which comprises essentially 83 percent chrome carbide, 15 percent nickel, and 2 percent tungsten by weight, with a plus or minus 10 percent variance. A material of the aforegoing composition may be obtained commercially under the trade name Carbaloy 608 a product of General Electric Corp. The aforementioned material has been found advantageous in its use as a blade material in the present invention in that it exhibits a Rockwell hardness of 90, is substantially wear resistant, and will machine to a good edge which is retained over long periods of use. It is considered that wear takes place in this material by grains of the chrome carbide falling out of the nickel binder, however, as the grain size is so minute the blade edge remains relatively smooth after a great deal of wear has taken place. Workers in the art will realize that the aforementioned characteristic is not to be found in ceramics or other materials which might be considered for the present application.

One of the most important features of the material chosen for the blade 28, however, is that it is relatively non-magnetic. As will be apparent to those familiar with the art, as the present invention provides for introducing the blade 28 into the tape path X, should the blade inadvertently become magnetized, a resultant erasure of the tape would take place. In some instances, this could destroy invaluable if not irreplaceable information prior to its detection. The aforementioned chrome carbide alloy has been found to display a remnant field less than 0.5 gauss after exposure to 5,000 gauss, and is therefore considered to be substantially non-magnetic for the purpose therein intended.

From the foregoing therefore, it will be seen that the various objectives of the invention have been achieved by providing a tape cleaner head 10 which is simple in construction and is wear resistant, also providing a feature of safety against inadvertant erasure of the tape.

While the present invention has been shown in but one embodiment, various changes and modifications may be made to the device as illustrated without departing from the spirit of the invention.

What is claimed is:

1. Tape transport apparatus comprising; tape drive means having a pair of spaced tape contacting surfaces describing a substantially straight linear path therebetween over which tape is transported during operation of the apparatus, and a tape cleaning device disposed between said tape contacting surfaces, said tape cleaning device comprising a tape cleaner head having an arcuate surface extending into said tape path to at least contact a tape moved therealong, an opening formed in said head surface at said point of contact and elongated in a direction transverse to said tape path, and an elongated blade member disposed in said opening and having a blade edge extending no greater than 0.002 inch beyond said head surface into said tape path, whereby said cleaning device forces a tape from said linear path in a direction away from said device and is effective to remove particles from a tape in motion during operation of the apparatus.

2. Tape cleaning apparatus as set forth in claim 1 wherein said blade member comprises a surface disposed in co-planar relation with the path of tape movement at that point in which said head extends into the tape path.

3. Tape cleaning apparatus as set forth in claim 2 wherein said blade surface intersects a second blade surface forming an angle of approximately 60° to form said blade edge extending into said tape path.

4. Tape cleaning apparatus as set forth in claim 3 which is characterized by a pair of said so formed edges, one edge directed upstream into said tape path and one edge directed downstream into said tape path for operating on said tape surface when moved along said path in either direction.

5. Tape cleaning apparatus as set forth in claim 3 wherein said blade is formed of a chrome carbide alloy having substantially non-magnetic characteristics.

6. Tape cleaning apparatus as ser forth in claim 3 wherein said blade material is composed of essentially 83 percent chrome carbide, 15 percent nickel, and 2 percent tungsten within a range of plus or minus 10 percent by volume.

7. Apparatus as set forth in claim 3 wherein said blade is formed of a chrome carbide alloy consisting of from 75 percent to 90 percent chrome carbide, 1 percent to 3 percent tungsten and the remaining percentage of nickel by volume.

8. Apparatus as set forth in claim 3 wherein said blade is formed from a chrome carbide alloy material which is effective to produce a substantially non-magnetic blade having a remnant field of less than 0.5 gauss after exposure to a magnetic field of 5,000 gauss.

9. The apparatus of claim 1 which further includes means for introducing sub-atmospheric pressure into said head opening to draw particles removed from the tape surface into said head for disposal.

* * * * *